(12) United States Patent
Wang et al.

(10) Patent No.: US 10,789,138 B2
(45) Date of Patent: Sep. 29, 2020

(54) SMB SERVICE FAULT PROCESSING METHOD AND STORAGE DEVICE

(71) Applicant: Huawei Technologies Co., Ltd., Shenzhen (CN)

(72) Inventors: Zhengjiang Wang, Chengdu (CN); Xianqiang Luo, Chengdu (CN); Yi He, Chengdu (CN); Keji Huang, Chengdu (CN); Jian Wu, Chengdu (CN); Mingqian Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 15/948,499

(22) Filed: Apr. 9, 2018

(65) Prior Publication Data
US 2018/0225183 A1    Aug. 9, 2018

Related U.S. Application Data

(63) Continuation of application No. PCT/CN2016/107237, filed on Nov. 25, 2016.

(51) Int. Cl.
*G06F 11/00* (2006.01)
*G06F 11/20* (2006.01)
(Continued)

(52) U.S. Cl.
CPC .......... *G06F 11/2056* (2013.01); *G06F 3/067* (2013.01); *G06F 11/1448* (2013.01);
(Continued)

(58) Field of Classification Search
CPC ............. G06F 11/1448; G06F 11/1458; G06F 11/1471; G06F 11/2056; G06F 11/2089; G06F 11/2094
See application file for complete search history.

(56) References Cited

U.S. PATENT DOCUMENTS 5,881,269 A * 3/1999 Dobbelstein .......... G06F 9/5027
                                                703/21
5,987,621 A    11/1999 Duso et al.
(Continued)

FOREIGN PATENT DOCUMENTS

CN          1826593 A      8/2006
CN          1870642 A     11/2006
(Continued)

OTHER PUBLICATIONS

Foreign Communication From a Counterpart Application, PCT Application No. PCT/CN2016/107237, International Search Report dated Aug. 30, 2017, 8 pages.
(Continued)

*Primary Examiner* — Joshua P Lottich
(74) *Attorney, Agent, or Firm* — Conley Rose, P.C.

(57) ABSTRACT

In a method for processing a server message block (SMB) service fault, a first storage device generates a file handle according to a first file open instruction from a host, and sends the file handle to a second storage device. The second storage device stores the file handle as a backup handle. The second storage device activates an Internet Protocol (IP) address of the first storage device according to fault information from the first storage device, and establishes a communication connection to the host. After the second storage device determines a file handle matches the handle identifier, the second storage device opens a file. Hence, when a storage device that processes an SMB service is faulty, the SMB service may be taken over by a secondary storage device such that the SMB service is executed without interruption.

20 Claims, 8 Drawing Sheets

(51) Int. Cl.
  *H04L 12/24* (2006.01)
  *H04L 29/14* (2006.01)
  *H04L 29/08* (2006.01)
  *G06F 11/14* (2006.01)
  *G06F 3/06* (2006.01)

(52) U.S. Cl.
  CPC ...... *G06F 11/1458* (2013.01); *G06F 11/1471* (2013.01); *G06F 11/2089* (2013.01); *G06F 11/2094* (2013.01); *H04L 41/0668* (2013.01); *H04L 67/1097* (2013.01); *H04L 69/40* (2013.01)

(56) References Cited

U.S. PATENT DOCUMENTS

| | | | |
|---|---|---|---|
| 7,103,638 | B1 | 9/2006 | Borthakur et al. |
| 8,122,070 | B1 | 2/2012 | Eshkenazi et al. |
| 8,225,057 | B1* | 7/2012 | Zheng ............... G06F 11/1458 711/114 |
| 8,484,365 | B1* | 7/2013 | Pittman ............. G06F 3/067 709/220 |
| 9,215,279 | B1* | 12/2015 | Le ....................... H04L 63/10 |
| 9,325,790 | B1* | 4/2016 | Le ....................... H04L 63/083 |
| 2005/0010709 | A1 | 1/2005 | Davies et al. |
| 2005/0091187 | A1 | 4/2005 | Madhavarapu et al. |
| 2005/0102549 | A1* | 5/2005 | Davies ............... G06F 11/201 714/4.1 |
| 2005/0207105 | A1* | 9/2005 | Davies ............... G06F 11/2028 361/679.4 |
| 2012/0151249 | A1 | 6/2012 | Swan et al. |
| 2013/0007518 | A1 | 1/2013 | George et al. |
| 2013/0097211 | A1 | 4/2013 | Kruse et al. |
| 2016/0239437 | A1 | 8/2016 | Le et al. |
| 2017/0060710 | A1* | 3/2017 | Ramani ............... G06F 11/2069 |
| 2017/0163740 | A1* | 6/2017 | Stopel ................. H04L 67/146 |
| 2017/0235507 | A1* | 8/2017 | Sinha ................. G06F 11/2069 711/114 |
| 2017/0242762 | A1* | 8/2017 | Feng ................... G06F 16/1774 |

FOREIGN PATENT DOCUMENTS

| | | |
|---|---|---|
| CN | 102624542 A | 8/2012 |
| CN | 103636165 A | 3/2014 |
| EP | 3051420 A1 | 8/2016 |
| EP | 3244322 A1 | 11/2017 |
| WO | 2016123744 A1 | 8/2016 |

OTHER PUBLICATIONS

Foreign Communication From a Counterpart Application, PCT Application No. PCT/CN2016/107237, Written Opinion dated Aug. 30, 2017, 4 pages.

Foreign Communication From a Counterpart Application, European Application No. 16910788.5, Extended European Search Report dated Aug. 13, 2018, 8 pages.

Foreign Communication From a Counterpart Application, Chinese Application No. 201680003334.1, Chinese Office Action dated Sep. 27, 2019, 5 pages.

* cited by examiner

SMB SERVICE FAULT PROCESSING METHOD AND STORAGE DEVICE

CROSS-REFERENCE TO RELATED APPLICATIONS

This application is a continuation of International Patent Application No. PCT/CN2016/107237 filed on Nov. 25, 2016, which is hereby incorporated by reference in its entirety.

TECHNICAL FIELD

The present disclosure relates to the communications field, and in particular, to a server message block (SMB) service fault processing method and a storage device.

BACKGROUND

An SMB protocol is a protocol for sharing a file, a printer, or a serial port between computers. Using the SMB protocol, a client may read/write a file on a server in various network environments, and may further make a service request to the server. In a Transmission Control Protocol (TCP)/Internet Protocol (IP) environment, after the client establishes a connection to the server, the client may send an SMB command to the server, and operate a file system, for example, access a shared directory, open a file, or read/write a file.

In a process of performing an input/output (I/O) port-based operation on a file, an application program needs to invoke a file operation function and transmit a file name, and further needs to select a path to the file to open the file in order to read data from the file. The function is used to retrieve a sequence number, that is, a file handle, and the file handle is a unique identification basis for the opened file. The application program needs to invoke a read file function, and transmit the file handle and a specified byte count to an operating system in order to read a piece of data from the file.

In other approaches, when a host accesses a file in a first storage device, a file system of the first storage device generates a file handle according to a file open instruction sent by the host, and opens the file using the file handle. If the first storage device is faulty, when the first storage device hands over to a second storage device, a file system of the second storage device cannot respond to a file open instruction resent by the host because the second storage device does not have the file handle. Consequently, the host cannot access the file, and an SMB service is interrupted.

SUMMARY

The present disclosure provides an SMB service fault processing method and a storage device such that when a storage device that processes an SMB service is faulty, the SMB service can be taken over by a secondary storage device in order to ensure that the SMB service is executed without interruption.

A first aspect of the present disclosure provides an SMB service fault processing method, where the method may be applied to a service processing system, and the service processing system includes a host and at least two storage devices. The method includes receiving, by a first storage device, a first file open instruction sent by the host, generating a file handle according to the first file open instruction, sending the file handle to a second storage device, sending a handle identifier of the file handle to the host, saving, by the second storage device, the file handle as a backup handle, establishing, by the host, a communication connection to the second storage device when the first storage device is faulty, determining, by the second storage device according to the handle identifier in a second file open instruction sent by the host, the file handle corresponding to the handle identifier, opening a file according to the file handle, and sending an operation result to the host, where the first storage device is a service device, and the second storage device is a backup device. In this implementation, after the first storage device backs up the file handle to the second storage device, when the first storage device is faulty, the second storage device may recover an SMB service according to the file handle in order to ensure that the SMB service is executed without interruption.

In a possible implementation of the first aspect, the first storage device generates the file handle according to a persistent handle obtaining subcommand included in the first file open instruction, checks whether the file handle is a persistent handle, and sends the file handle to the second storage device if the file handle is a persistent handle. In this implementation, the second storage device backs up only a persistent handle.

In another possible implementation of the first aspect, the second file open instruction includes a handle restoration subcommand, and the handle identifier is carried in the handle restoration subcommand.

In another possible implementation of the first aspect, when the first storage device, the second storage device, and a distributed lock server belong to a same storage array, before sending the file handle to the second storage device, the first storage device receives a lock instruction sent by the host, and sends a file lock request to the distributed lock server according to the lock instruction. The distributed lock server sets, according to the file lock request, a file lock for the file corresponding to the file handle, and then the first storage device sends the file lock to the second storage device, and the second storage device stores the file lock as a backup file lock, where the first storage device may further establish a correspondence between the file lock and the file handle. In this implementation, in addition to the file handle, the secondary storage device may further back up the file lock.

Further, in another possible implementation of the first aspect, after storing the file handle as the backup handle, the second storage device sends a silence request to the distributed lock server, where file information carried in the silence request corresponds to the backup handle, and the distributed lock server silently sets, according to the file information, a file corresponding to the backup handle in the second storage device. In this implementation, after silently setting the file, the distributed lock server does not allocate a file lock for the file when receiving another lock request for the file.

Further, in another possible implementation of the first aspect, after determining the file handle corresponding to the handle identifier, the second storage device determines the backup file lock corresponding to the file handle, and sends information about the backup file lock to the distributed lock server, and the distributed lock server locks the file according to the information about the backup file lock.

In another possible implementation of the first aspect, when the first storage device and a first distributed lock server belong to a same storage array, and the first storage device and the second storage device belong to different storage arrays, before sending the file handle to the second storage device, the first storage device receives a lock instruction sent by the host, and sends a file lock request to the first distributed lock server according to the lock instruction, the distributed lock server sets, according to the file lock request, a file lock for the file corresponding to the file handle, the first storage device sends the file lock to the second storage device, and the second storage device stores the file lock as a backup file lock. In this implementation, in addition to the file handle, the secondary storage device may further back up the file lock.

Further, in another possible implementation of the first aspect, a second distributed lock server and the second storage device belong to a same storage array. After storing the file handle as the backup handle, the second storage device sends a silence request to the second distributed lock server, where file information carried in the silence request corresponds to the backup handle, and the second distributed lock server silently sets, according to the file information, a file corresponding to the backup handle in the second storage device. In this implementation, when the first storage device and the second storage device belong to different storage arrays, after silently setting a backup file, the distributed lock server in a second storage array does not allocate a file lock for the backup file when receiving another lock request for the file.

Further, in another possible implementation of the first aspect, after obtaining the file handle corresponding to the handle identifier, the second storage device determines the backup file lock corresponding to the file handle, and sends information about the backup file lock to the second distributed lock server, and the second distributed lock server locks the file according to the information about the backup file lock. In this implementation, in addition to the file handle, the secondary storage device may further restore the file lock for the file in order to ensure integrity of an SMB service.

Further, in another possible implementation of the first aspect, the second storage device starts timing when the first storage device is faulty, and when a timing duration reaches a preset duration, the second storage device deletes the file handle, or sets the file handle to be invalid. In this implementation, when the service device is provided with multiple secondary storage devices, the secondary storage device may set an aging duration. When the aging duration expires, the secondary storage device may clear the file handle in order to save storage resources.

A second aspect provides an SMB service fault processing method, including sending, by a host, a first file open instruction to a first storage device, where the first file open instruction includes a persistent handle request, when the first storage device is faulty and an IP address of the first storage device is activated on a second storage device, sending, by the host, a second file open instruction to the second storage device, where the second file open instruction includes a handle identifier, and the handle identifier is used to instruct the second storage device to obtain a file handle of a file, and receiving, by the host, an operation result returned by the second storage device. It can be learned that when the service device is faulty, the host may execute an SMB service on the backup device, and the backup device may read/write an SMB service file according to the file handle in order to ensure that the SMB service is executed without interruption.

In a possible implementation of the second aspect, the first file open instruction includes a persistent handle obtaining subcommand, and the persistent handle obtaining subcommand is used to instruct the first storage device to generate a persistent handle.

In another possible implementation of the second aspect, the second file open instruction includes a handle restoration subcommand, and the handle restoration subcommand carries the handle identifier.

In another possible implementation of the second aspect, the host sends a lock instruction to the first storage device, where the lock instruction is used to set a file lock for the file corresponding to the file handle.

A third aspect provides a storage system, including a first storage device and a second storage device. The first storage device may implement a function of the first storage device in the SMB service fault processing method provided in the first aspect. The second storage device may implement a function of the second storage device in the SMB service fault processing method provided in the first aspect. A function of a storage device may be implemented by hardware, or may be implemented by executing corresponding software by hardware.

A fourth aspect provides a host, which may implement a function of the host in the SMB service fault processing method provided in the second aspect. A function of a host may be implemented by hardware, or may be implemented by executing corresponding software by hardware.

A fifth aspect provides a service processing system, including the host provided in the fourth aspect and the storage system provided in the third aspect.

It can be learned from embodiments of the present disclosure that after generating the file handle according to the first file open instruction sent by the host, the first storage device sends the file handle to the second storage device, the second storage device saves the file handle as the backup handle, and when the first storage device is faulty, the second storage device establishes the communication connection to the host, receives the second file open instruction sent by the host, determines, according to the handle identifier in the second file open instruction, the file handle corresponding to the handle identifier, opens the file according to the file handle, and sends the operation result to the host. In the embodiments of the present disclosure, the file handle may be backed up in a different storage array or in a different storage device in a same storage array. When the service device (that is, the first storage device) is faulty, the backup device (that is, the second storage device) may take over the SMB service in order to ensure that the SMB service is executed without interruption.

DESCRIPTION OF EMBODIMENTS

Figure 1:
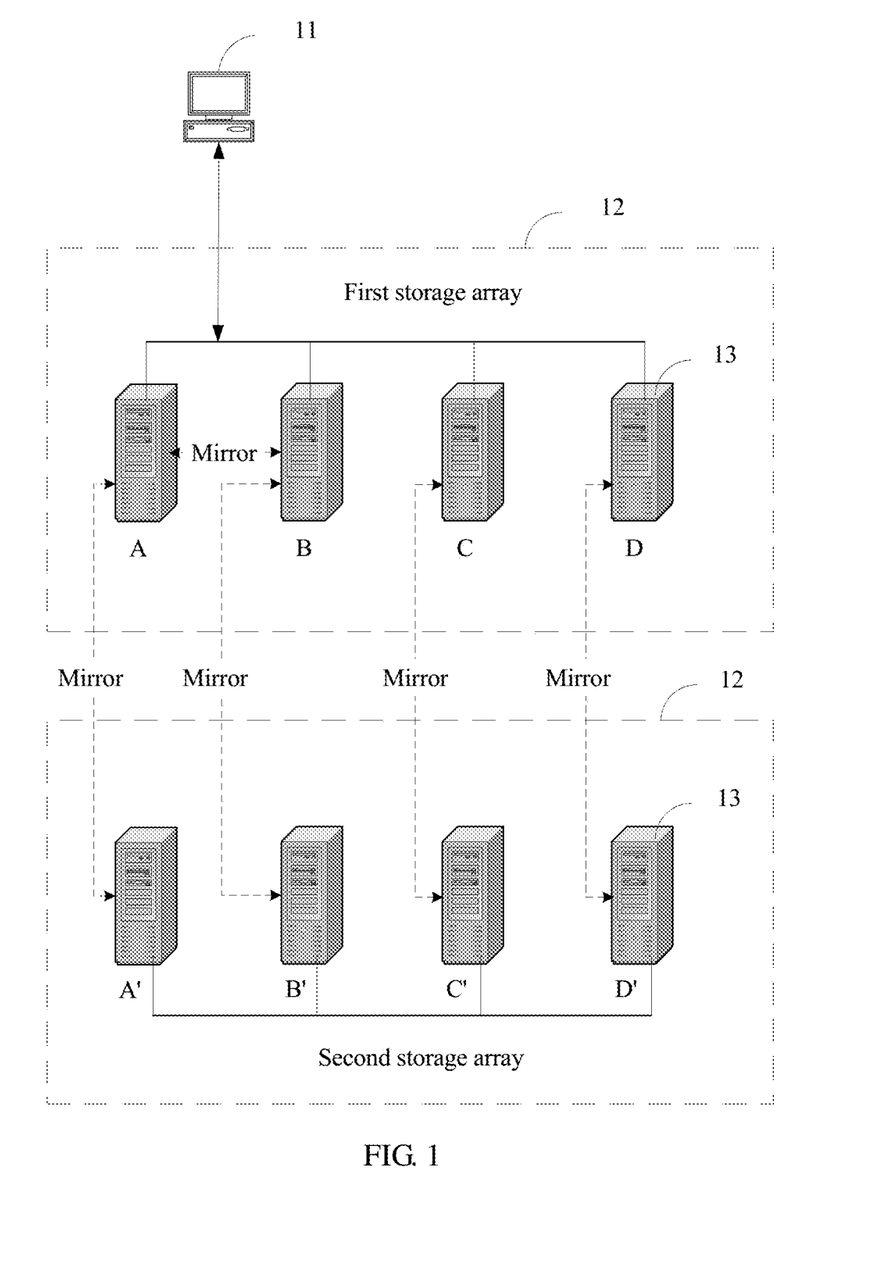
FIG. 1 is a diagram of an architecture of a service processing system according to an embodiment of the present disclosure.

The present disclosure provides an SMB service fault processing method, and the method is applied to a service processing system. Referring to FIG. 1, FIG. 1 is a schematic diagram of an architecture of a service processing system according to an embodiment of the present disclosure.

The service processing system includes a host 11 and multiple storage arrays 12.

The host 11 is a computing device that has a computing capability, and can complete various types of data processing work. The host may be a personal computer (PC), a mobile phone, a tablet, an in-vehicle computer, a wearable electronic device, a personal digital assistant (PDA), or the like.

The storage array 12 includes one or more storage devices 13. The storage device 13 has one or more backup devices. These backup devices may be located in the same storage array 12 as the storage device 13, or may be located in a different storage array 12 from the storage device 13. For example, in a first storage array 12, a storage device B is a backup device of a storage device A, and in a second storage array 12, a storage device A' may be used as a backup device of the storage device A, and a storage device B' may be used as a backup device of the storage device B. If the host 11 accesses a storage device 13 (for example, the storage device A), when the storage device A is faulty, the host 11 may restore data from the storage device B, the storage device A', or the storage device B'. Both the first storage array 12 and the second storage array 12 may be implemented using the storage array 12, and the storage devices A, B, A', and B' may be implemented using the storage device 13. Further, storage devices C' and D' in the second storage array 12 may backup storage devices C and D in the first storage array 12, respectively.

Figure 2:
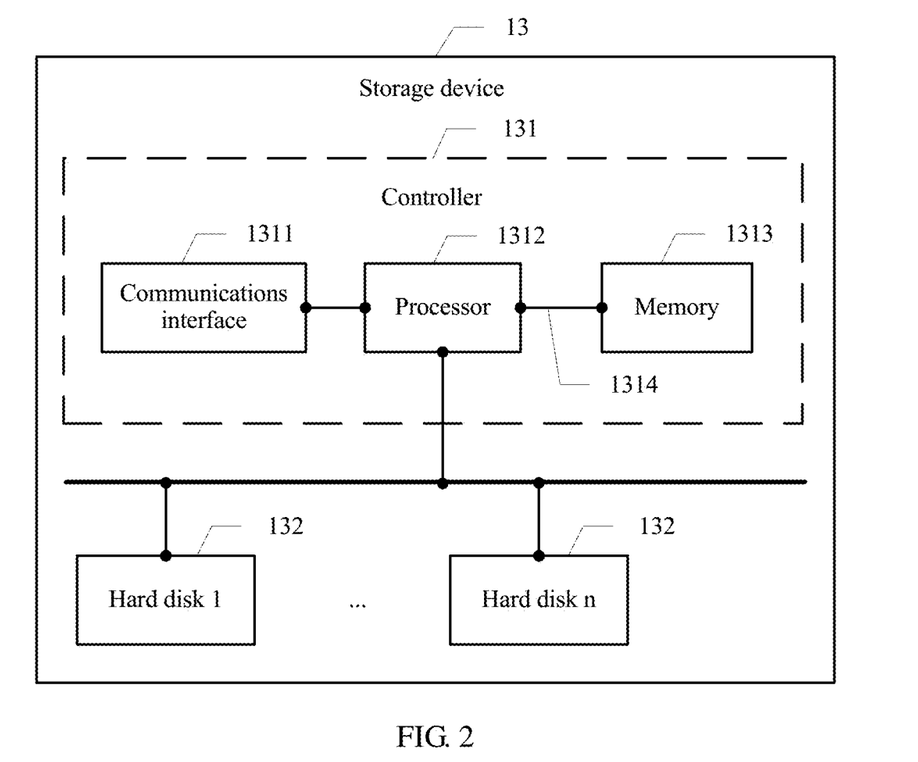
FIG. 2 is a schematic structural diagram of a storage device according to an embodiment of the present disclosure.

Referring to FIG. 2, the storage device 13 includes a controller 131 and one or more hard disks 132. The controller 131 includes a communications interface 1311, a processor 1312, a memory 1313, and a bus 1314. The communications interface 1311, the processor 1312, and the memory 1313 are connected to each other using the bus 1314. The memory 1313 is configured to store data and an operation instruction, and the processor 1312 may perform, by invoking the operation instruction stored in the memory 1313, the SMB service fault processing method shown in FIG. 3 to FIG. 6.

The processor 1312 may be a general purpose processor, including a central processing unit (CPU). The memory 1313 may be a random access memory (RAM).

Figure 3:
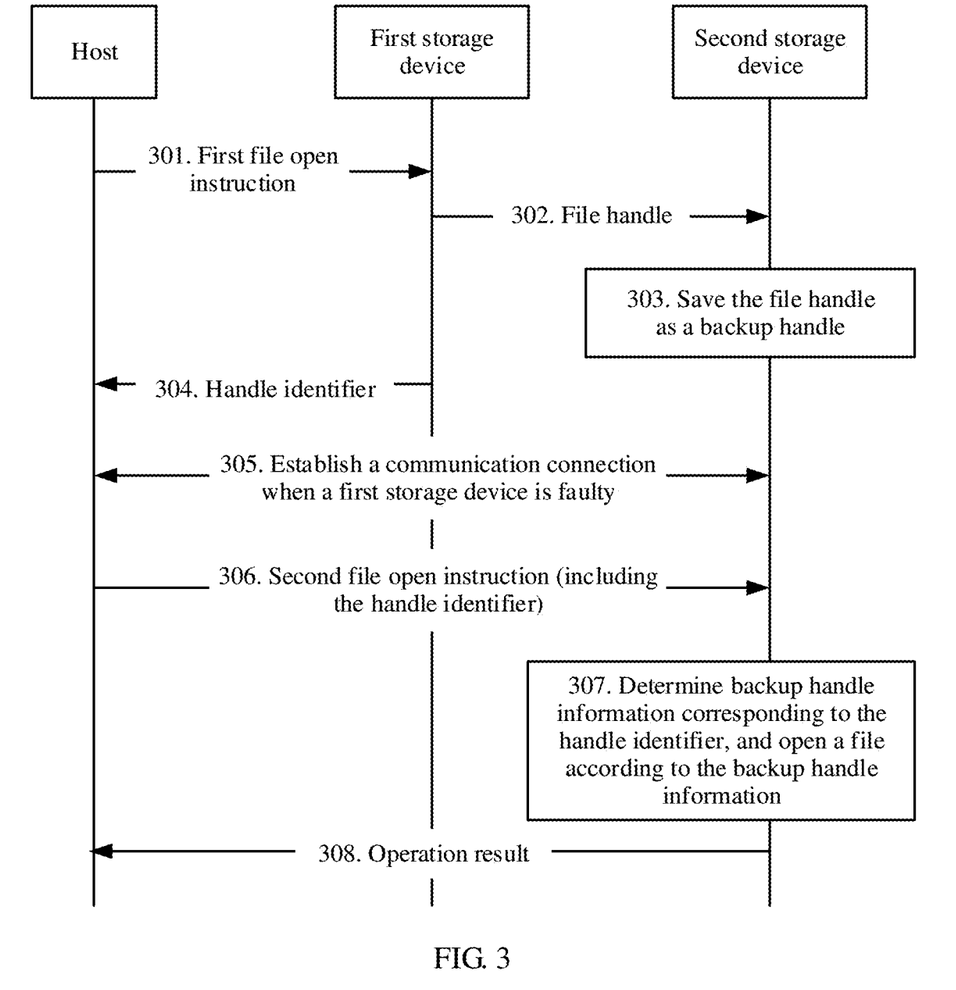
FIG. 3 is a schematic diagram of an SMB service fault processing method according to an embodiment of the present disclosure.

The SMB service fault processing method provided in the present disclosure may be implemented based on the foregoing service processing system. A scenario in which the SMB service fault processing method is applied to different storage arrays is first described. Referring to FIG. 3, an embodiment of the SMB service fault processing method provided in the present disclosure includes the following steps.

Step 301: A first storage device receives a first file open instruction sent by a host, where the host is similar to the host 11 shown in FIG. 1.

In this embodiment, the first storage array is configured to process a file access request of the host. The first storage device may be any storage device that processes an SMB service in the first storage array.

The first file open instruction is used to access a file in the first storage device. When the host sends the first file open instruction to the first storage device, the first storage device generates a file handle according to the first file open instruction, and returns a handle identifier of the file handle to the host. The file handle includes handle expectation permission, and the handle expectation permission specifies access permission, exclusive permission, or a range lock for the file. The access permission is permission to read the file, write the file, or delete the file. The exclusive permission indicates that another host cannot perform a read, write, or delete operation on the file. The range lock is used to protect data in a specific area in the file, and the data in the area is readable, writable, or exclusive. After generating the file handle, the first storage device may obtain information such as file permission or a range lock according to the file handle, thereby facilitating handle restoration.

The first file open instruction includes a persistent handle obtaining subcommand, and the first storage device generates a persistent file handle according to the persistent handle obtaining subcommand. Further, if the host uses a persistent file handle to access a file, when a storage device is faulty, the host may wait for a period of time during which the host may reconnect to a normal storage device, and send a file open instruction that carries a handle restoration subcommand in order to restore a service. For example, the persistent handle obtaining subcommand may be a durable handle request version 2 (DH2Q) subcommand or a durable handle request (DHnQ) subcommand, and the handle restoration subcommand is a durable handle reconnect version 2 (DH2C) subcommand or a durable handle reconnect (DHnC) subcommand.

Step 302: The first storage device generates a file handle according to the first file open instruction, and sends the file handle to a second storage device.

The second storage device is any storage device in the second storage array. As a backup device, the second storage device is configured to process an SMB service when the first storage device is faulty. In a possible manner, a storage device is deployed in the second storage array. A file system of the storage device is a mirror of a file system of the first storage device, and the storage device serves as the second storage device. After receiving file handle backup information, the second storage device saves the file handle backup information.

In addition, another storage device may be selected in the second storage array for backup. In a possible implementation, a hash operation is performed on the handle identifier of the file handle to obtain a storage device identifier by means of computation, and a storage device corresponding to the storage device identifier is configured to save the file handle backup information. In another possible manner, a modulo operation is performed on the handle identifier of the file handle, an obtained remainder is a storage device identifier, and a storage device corresponding to the storage device identifier is configured to save the file handle backup information.

When the first storage device executes different types of services, the first storage device may generate a common file handle and a persistent file handle. After generating the file handle, the first storage device checks whether the file handle is a persistent handle, and if the file handle is a persistent handle, the first storage device performs step 303, or if the file handle is not a persistent handle, the first storage device may not send the file handle to the second storage device.

It should be noted that a version number mechanism is used in a handle synchronization process in which the first storage device sends the file handle to the second storage device, and a version number may be configured for both the file and the file handle. A version number is used to distinguish file handles backed up in different periods of time. The second storage device may use a latest version number as a determining basis, and if a version number of a received file handle is not the latest version number, the second storage device may discard the file handle or set the file handle to be invalid.

In addition, the host may send a lock instruction to the first storage device, and the lock instruction is used to set a file lock for a file corresponding to the file handle. The file lock is a range lock, and a file part corresponding to the file lock belongs to readable or writable information. After the file lock is set, file lock backup information is generated, and a correspondence between the file lock backup information and the file handle backup information is established. When the file handle backup information and the file lock backup information are synchronized to the second storage device, the second storage device may obtain the correspondence between the file lock backup information and the file handle backup information.

It can be learned from the above that a lock operation is first performed on the file in the first storage device, and then a step in which the first storage device synchronizes the file lock to the second storage device is performed. If the file lock is faulty to be synchronized, unlocking rollback is performed for the lock operation. In an unlocking process, the file lock backup information is first synchronized, and then unlocking is requested from a distributed lock server in the first storage array. If the file lock backup information is faulty to be synchronized, unlocking is not performed, and the unlocking operation directly is faulty. The distributed lock server may be any storage device in which a distributed lock management application program is deployed, or may be an electronic device that is independently deployed in a storage array and that is configured to manage a distributed lock.

Step 303: The second storage device saves the file handle as a backup handle.

It should be noted that, in a process in which the first storage array synchronizes the file handle or the file lock to the second storage array, if a synchronization error occurs, for example, if the second storage array returns a synchronization error, or the first storage array cannot send the file handle and/or the file lock, the first storage array is set to a state of being unable to switch a service, and then performs resynchronization repair on the backup information. After the repair is completed, synchronization of all backup information is completed, and the first storage array is set to a state of being able to switch a service.

Step 304: The first storage device sends a handle identifier of the file handle to the host.

Step 305: When the first storage device is faulty, the second storage device establishes a communication connection to the host.

When the first storage array is faulty, after receiving fault information, the second storage array is upgraded from a backup array to a primary service array, and broadcasts an event to each storage device in the second storage array. Any storage device that runs normally is selected from the second storage array, and an IP address of the failed device is activated on the storage device that runs normally. After the IP address is activated, the host establishes a communication connection to the backup device in the second storage array. When obtaining upgrade event information, the second storage device may learn that the first storage device is faulty.

Step 306: The second storage device receives a second file open instruction (including the handle identifier) sent by the host. After receiving the handle identifier sent by the first storage device, the host generates the second file open instruction that carries the handle identifier. The second file open instruction and the first file open instruction specify the same file. In an optional embodiment, the second file open instruction includes a handle restoration subcommand, and the handle restoration subcommand carries the handle identifier.

Step 307: The second storage device determines, according to the handle identifier in the second file open instruction, backup handle information corresponding to the handle identifier, and opens a file according to the backup handle information.

Step 308: The second storage device sends an operation result to the host.

In this embodiment, both the first storage array and the second storage array may be implemented using the storage array 12, and both the first storage device and the second storage device may be implemented using the storage device 13. If the host is disconnected from the first storage device, because the second storage device uses the IP address of the first storage device, the host may send a file open instruction to the second storage device, and the second storage device may respond to the file open instruction, obtain the file handle, and then open the file according to the backup handle information, and then return the operation result. When the file is successfully opened, the operation result may be 1, and it indicates that the file is successfully opened. If there is corresponding range lock information in the backup handle information, the distributed lock server restores the range lock according to the range lock information in the backup handle information, and finally returns a restoration result to the host.

Based on the embodiment shown in FIG. 3, in an optional embodiment, the foregoing method further includes sending, by the second storage device, a silence request to the distributed lock server in the second storage array after receiving the fault information, where the silence request carries file information that needs to be silent, and silently setting, by the distributed lock server, a file corresponding to the backup handle in the second storage device.

In this embodiment, when the first storage array is faulty, after receiving the fault information, the second storage array broadcasts the fault information to each storage device in the second storage array. Storage devices in the second storage array may traverse all backup handles managed by the storage devices, select a backup handle and a backup file lock that are stored for the first storage device, determine, according to the selected backup handle, the file information that needs to be silent, where the file information refers to a file identifier (for example, a file name), and then send the file information to the distributed lock server. The distributed lock server sets a silence identifier for the file corresponding to the backup handle. For example, after the distributed lock server sets the silence identifier for a file text 1 corresponding to a backup handle 1, when receiving another file lock request for the text 1, the distributed lock server does not grant a file lock in order to avoid a handle restoration fault caused because the file is preempted.

When the service device is faulty, if the service device does not perform a file restoration procedure, a backup handle occupies a storage resource of a backup device, thereby causing a waste of storage resources. To resolve this problem, in another optional embodiment of the present disclosure, the method further includes starting, by the second storage device, timing when receiving the fault information sent by the first storage device, and deleting, by the second storage device, the file backup handle, or setting the file backup handle to be invalid when a timing duration reaches a preset duration.

In this embodiment, a secondary storage device may set an aging duration. When a duration obtained by timing by the secondary storage device reaches the preset aging duration, the secondary storage device may clear a backup handle in order to save storage resources.

It should be noted that after the fault information is received, processes in which the second storage device sets the silence identifier and the aging duration for the file handle may be performed at the same time.

Figure 4:
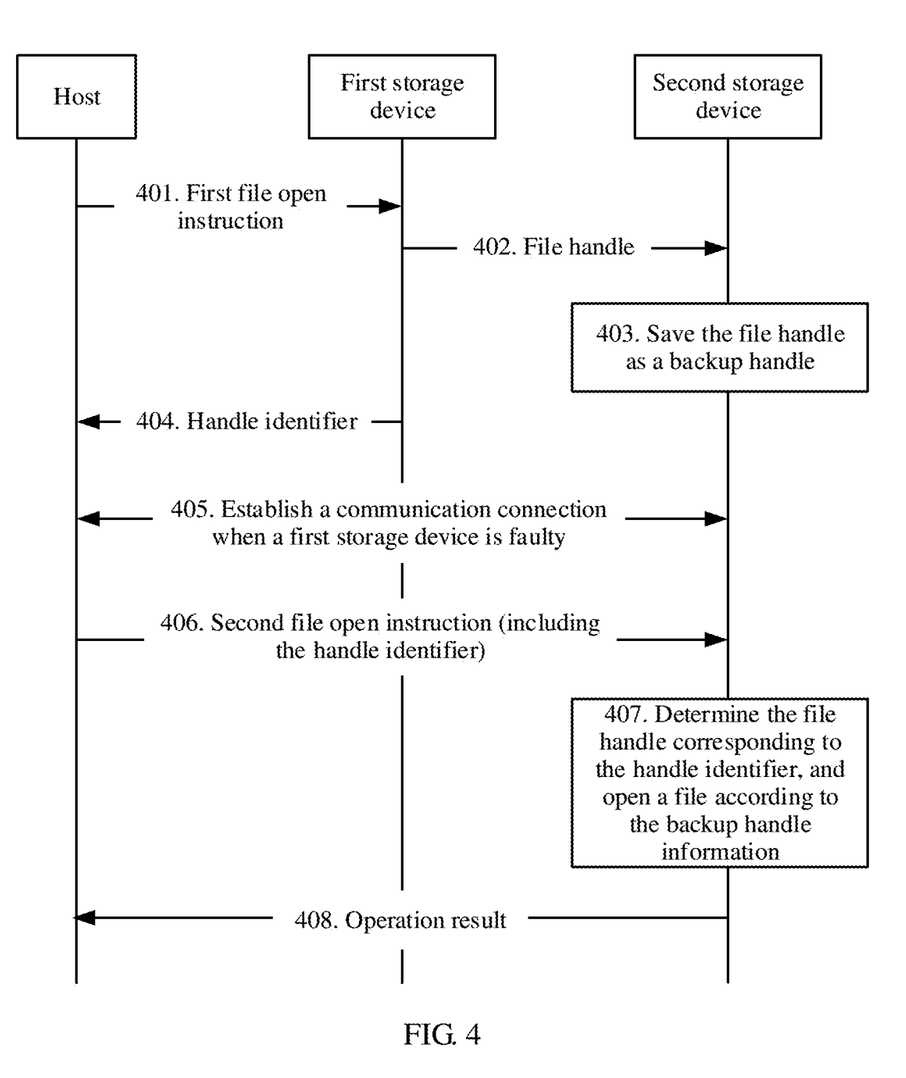
FIG. 4 is another schematic diagram of an SMB service fault processing method according to an embodiment of the present disclosure.

A scenario in which the SMB service fault processing method is applied to a same storage array is described below. Referring to FIG. 4, another embodiment of the SMB service fault processing method provided in the present disclosure includes the following steps.

Step 401: A first storage device receives a first file open instruction sent by a host, where the host is similar to the host 11 shown in FIG. 1.

In this embodiment, the first storage device and a second storage device belong to a same storage array. The first storage device is a service device, and is configured to process an SMB service. The second storage device is any storage device in the storage array. As a backup device, the second storage device is configured to process the SMB service when the first storage device is faulty.

Step 402: The first storage device generates a file handle according to the first file open instruction, and sends the file handle to a second storage device.

Step 403: The second storage device saves the file handle as a backup handle.

Figure 5:
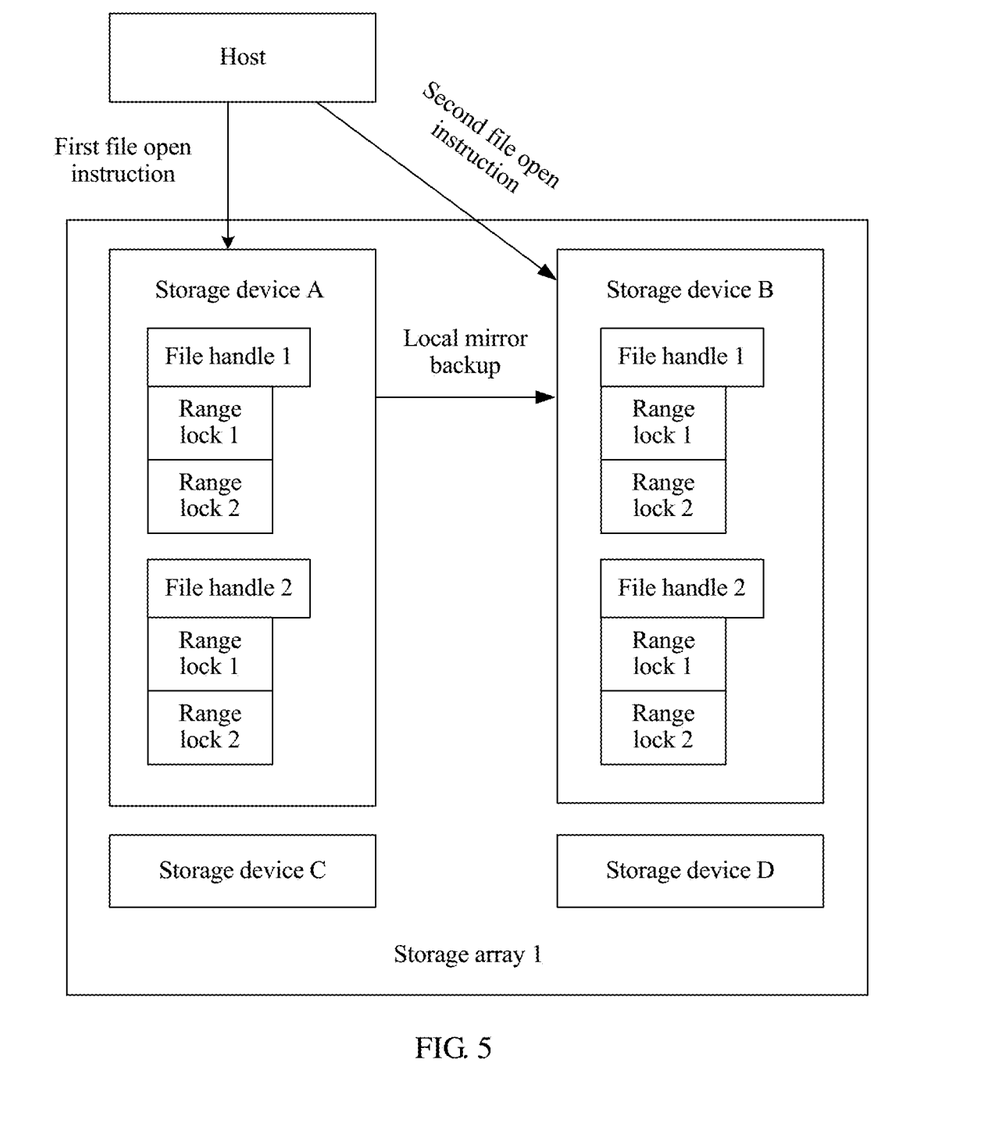
FIG. 5 is another schematic diagram of an SMB service fault processing method according to an embodiment of the present disclosure.

For example, referring to FIG. 5, when a host accesses a file file_1 in a storage device A, when receiving a first file open instruction, the storage device A may generate a file handle 1 of the file_1, and synchronize the file handle 1 to a storage device B (i.e., local mirror backup), and the storage device B saves the file handle 1. The storage device A may further set a file lock (such as a range lock 1 and a range lock 2) for the file_1, and then synchronize the range lock 1 and the range lock 2 to the storage device B. Further, the storage device A and the storage device B located in a storage array 1.

Step 404: The first storage device sends a handle identifier of the file handle to the host.

Step 405: When the first storage device is faulty, the second storage device establishes a communication connection to the host.

When the first storage device is faulty, the first storage device may broadcast fault information in the storage array, and the second storage device in the same storage array may detect the fault information by means of listening. The host may activate, on any normal device in the storage array, an IP address of the first storage device, and then establish a communication connection to the second storage device.

Step 406: The second storage device receives a second file open instruction (including the handle identifier) sent by the host.

Step 407: The second storage device determines, according to the handle identifier in the second file open instruction, the file handle corresponding to the handle identifier, and opens a file according to backup handle information.

Step 408: The second storage device sends an operation result to the host.

For example, referring to FIG. 5, in a process of accessing the file_1 by the host, if the host is disconnected from the storage device A, because the storage device B uses an IP address of the storage device A, the host may send a second file open instruction to the storage device B, and the storage device B may respond to the second file open instruction, obtain the file handle 1, and then open the file according to the file handle 1. The storage device B may obtain the range lock 1 and the range lock 2 according to the file handle 1, and a distributed lock server restores the range locks (that are, the range lock 1 and the range lock 2) of the file, and finally returns a restoration result to the host. It should be noted that after the storage device B is upgraded to a primary service device, a storage device C may be used as a backup device, and after the storage device C is upgraded to the primary service device and the storage device A recovers to normal, the storage device A may be used as a backup device to form a ring backup relationship in order to ensure reliability of the service processing system.

Based on the embodiment shown in FIG. 4, in an optional embodiment, after step 403, the foregoing method further includes receiving, by all storage devices, the fault information of the first storage device, and traversing all backup handles generated for the first storage device, and silently setting, by the distributed lock server, files corresponding to the backup handles. In this embodiment, a process in which the distributed lock server silently sets the file corresponding to the backup handle is similar to the process in which the distributed lock server silently sets the file corresponding to the backup handle in the optional embodiment shown in FIG. 3, and details are not described herein.

In an optional embodiment, after step 403, the method further includes starting, by all the storage devices, timing when receiving the fault information of the first storage device, and deleting, by all the storage devices, the backup handles that are generated for the first storage device and that are managed by all the storage devices, or setting the backup handles to be invalid when a timing duration reaches a preset duration.

In this embodiment, a secondary storage device may set an aging duration. When a timing duration reaches the preset aging duration, the secondary storage device may clear a backup handle in order to save storage resources.

For ease of understanding, the following uses a specific application scenario to describe in detail the SMB service fault processing method in this embodiment of the present disclosure.

Figure 6:
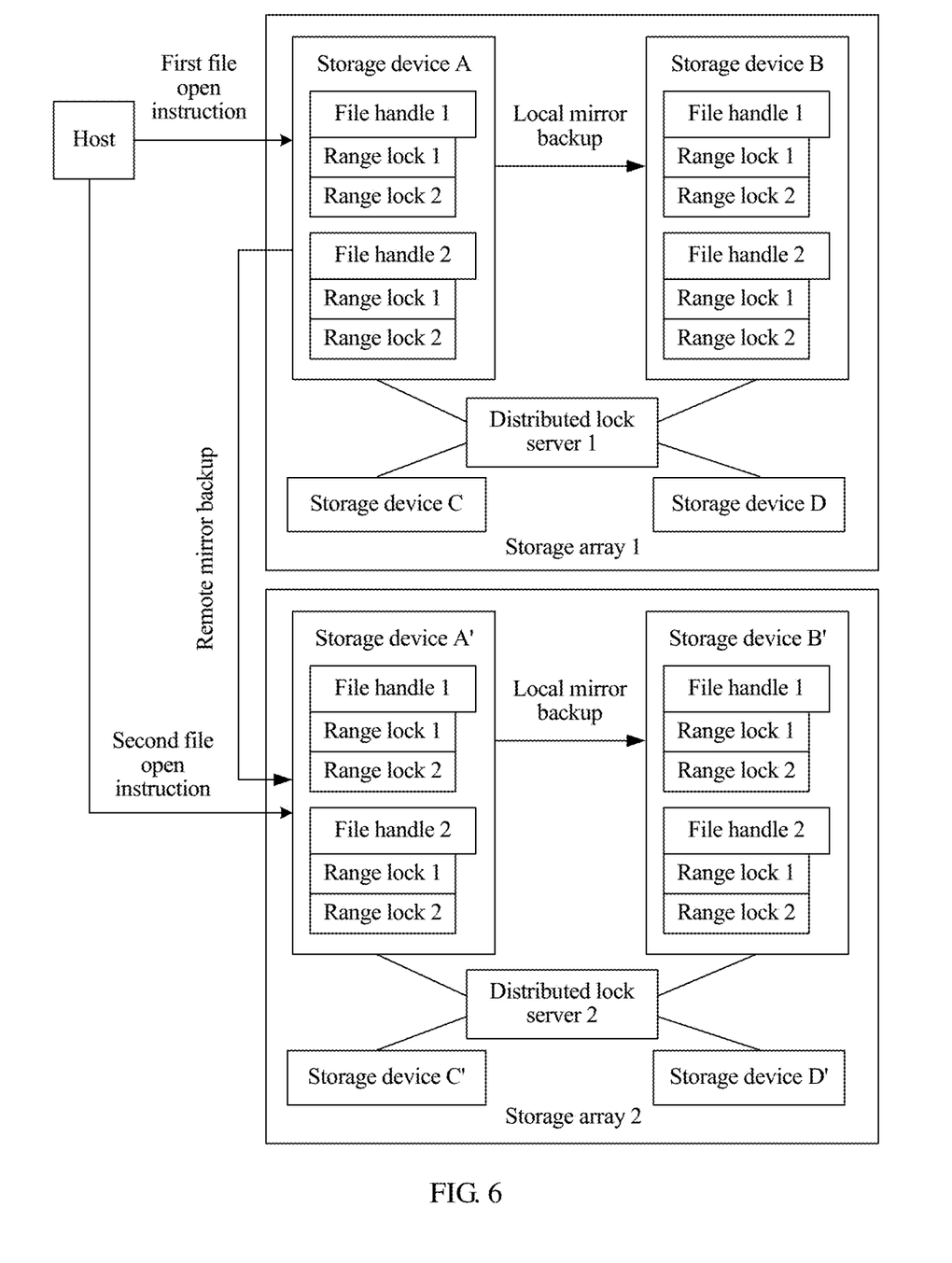
FIG. 6 is another schematic diagram of an SMB service fault processing method according to an embodiment of the present disclosure.

Referring to FIG. 6, a storage device A belongs to a storage array 1, a storage device A' belongs to a storage array 2, the storage array 2 is a backup array of the storage array 1, the storage device A' is a backup device of the storage device A, a storage device B' is a backup device of the storage device A', a distributed lock server in the storage array 1 is a distributed lock server 1, a distributed lock server in the storage array 2 is a distributed lock server 2, and an IP address of the storage device A is x.x.x.2.

When a host accesses a file file_1 in the storage device A, the host sends a first file open instruction to the storage device A, and a file system of the storage device A accesses the file in response to the first file open instruction. The storage device A generates a file handle 1 of the file_1 according to the first file open instruction, synchronizes the file handle 1 to the storage device A', and returns a handle identifier of the file handle 1 to the host. The storage device A may further generate, according to another file open instruction, a file handle 2 corresponding to a file_2, and synchronize the file handle 2 to the storage device A'.

The host may further initiate a lock instruction for the file_1 to the storage device A, the storage device A initiates a lock request to the distributed lock server 1 according to the lock instruction, and the distributed lock server 1 sets a range lock 1 and a range lock 2 for the file_1. After the locking succeeds, the storage device A synchronizes the range lock 1 and the range lock 2 to the storage device A'.

When the storage array 1 is faulty, after the storage array 2 receives fault information, the storage device A' in the storage array 2 may traverse all backup handles, and select a backup handle (that is, the file handle 1) and backup file locks (that are, the range lock 1 and the range lock 2) that are corresponding to the storage device A, and the distributed lock server 2 sets a silence identifier for the file_1. When receiving the fault information, the storage device A' may further set an aging duration for the file handle 1 of the file_1, and then may set an IP address of the storage device A' to x.x.x.2, and the host establishes a connection to the storage device A'.

When the file handle is a persistent handle, the host sends a second file open instruction to x.x.x.2 after waiting for a period of time.

If there is no file lock for the file_1, the storage device A' may obtain the file handle 1 according to the handle identifier that is of the file handle 1 and that is in the second file open instruction, and access the file_1 according to the file handle 1.

If the file_1 is provided with the range lock 1 and the range lock 2, the storage device A' may obtain the file handle 1 and the range lock 1 and the range lock 2 according to the handle identifier that is of the file handle 1 and that is in the second file open instruction, and then the distributed lock server 2 restores the range locks (that are, the range lock 1 and the range lock 2) of the file_1, and returns a restoration result to the host.

A method for processing another file (for example, the file_2) in the storage device A is similar to the method for processing the file_1, and a method for processing a file in another storage device (for example, a storage device B, C, or D) in the storage array 1 is similar to the method for processing the file in the storage device A, and details are not described herein again.

The foregoing describes the SMB service fault processing method in the embodiments of the present disclosure, and the following further describes a service processing system 700 provided in the embodiments of the present disclosure.

Figure 7:
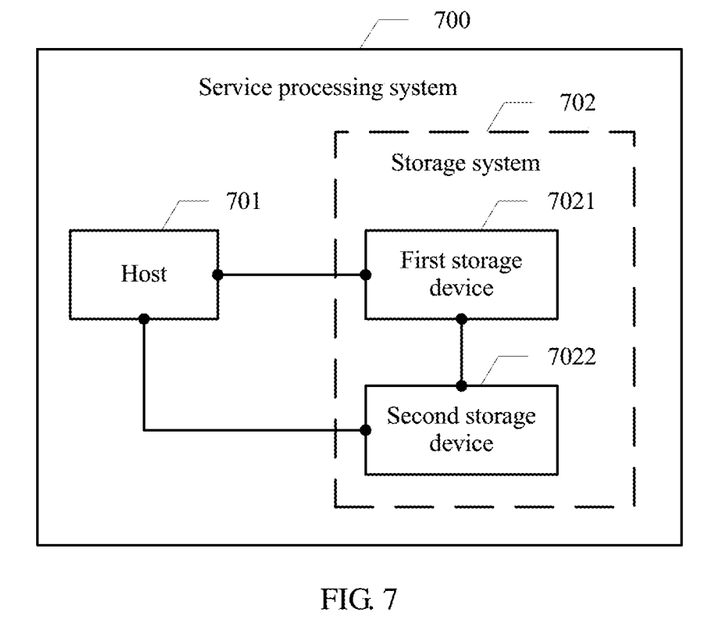
FIG. 7 is a schematic structural diagram of a service processing system according to an embodiment of the present disclosure.

The service processing system 700 includes a host 701 and a storage system 702. The host 701 may implement functions of the host in the foregoing SMB service fault processing method, and the storage system 702 includes at least a first storage device 7021 and a second storage device 7022. The first storage device 7021 may implement functions of the first storage device in the SMB service fault processing method in the embodiments shown in FIG. 3 to FIG. 6, and the second storage device 7022 may implement functions of the second storage device in the SMB service fault processing method in the embodiments shown in FIG. 3 to FIG. 6. The following describes in detail the storage system 702 and the host 701. Referring to FIG. 7, in an embodiment of the storage system 702 provided in the present disclosure the first storage device 7021 is configured to receive a first file open instruction sent by the host 701, generate a file handle according to the first file open instruction, and send the file handle to the second storage device 7022, and the second storage device 7022 is configured to save the file handle as a backup handle, and the second storage device 7022 is further configured to receive a second file open instruction sent by the host 701, obtain, according to a handle identifier in the second file open instruction, a file handle corresponding to the handle identifier, open a file according to the file handle, and send an operation result to the host 701.

In this embodiment, when the first storage device 7021 is faulty, the second storage device 7022 may take over an SMB service according to the backup file handle in order to ensure that the SMB service is executed without interruption.

Based on the embodiment shown in FIG. 7, in an optional embodiment, the first file open instruction includes a persistent handle obtaining subcommand. The first storage device 7021 is further configured to generate the file handle according to the persistent handle obtaining subcommand, check whether the file handle is a persistent handle, and perform the step of sending the file handle to the second storage device 7022 if the file handle is a persistent handle.

Based on the embodiment shown in FIG. 7, in an optional embodiment, the second file open instruction includes a handle restoration subcommand, and the handle identifier is carried in the handle restoration subcommand.

In the foregoing optional embodiments, the second storage device 7022 and the first storage device 7021 may belong to a same storage array, or may belong to different storage arrays.

Figure 8:
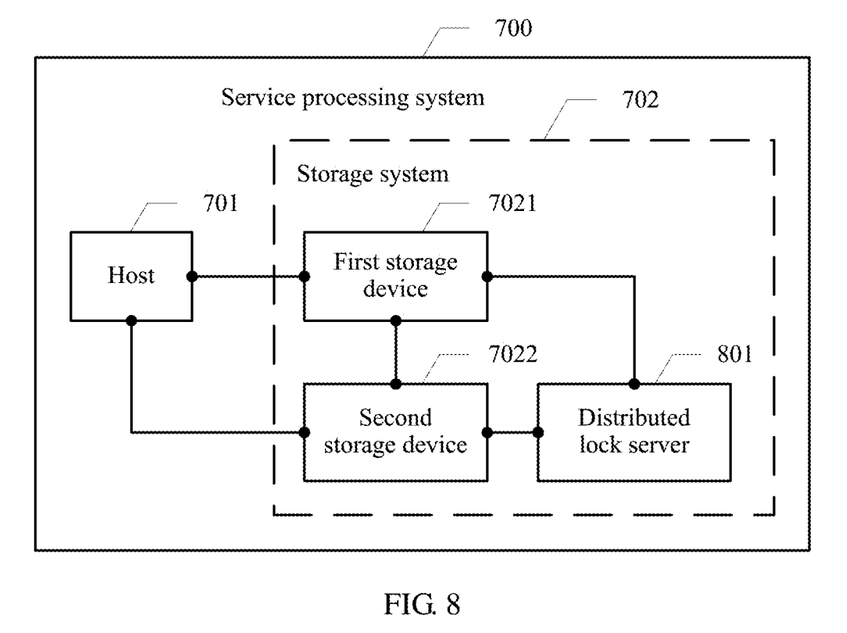
FIG. 8 is another schematic structural diagram of a service processing system according to an embodiment of the present disclosure.

Based on the embodiment shown in FIG. 7, in another optional embodiment of the present disclosure, referring to FIG. 8, the storage system 702 further includes a distributed lock server 801.

The first storage device 7021 is further configured to receive a lock instruction sent by the host 701 before sending the file handle to the second storage device 7022, and send a file lock request to the distributed lock server 801 according to the lock instruction. The distributed lock server 801 sets, according to the file lock request, a file lock for the file corresponding to the file handle. The first storage device 7021 sends the file lock to the second storage device 7022, and the second storage device 7022 stores the file lock as a backup file lock.

Based on the embodiment shown in FIG. 8, in an optional embodiment, the second storage device 7022 is further configured to send a silence request to the distributed lock server 801 after storing the file handle as the backup handle, where file information carried in the silence request corresponds to the backup handle, and the distributed lock server 801 is further configured to silently set, according to the file information, a file corresponding to the backup handle in the second storage device 7022.

Based on the embodiment shown in FIG. 8, in another optional embodiment of the present disclosure, the second storage device 7022 is further configured to determine the backup file lock corresponding to the file handle, and send information about the backup file lock to the distributed lock server 801, and the distributed lock server 801 is further configured to lock, according to the information about the backup file lock, the file corresponding to the backup handle.

Based on the embodiment shown in FIG. 8, in another optional embodiment of the present disclosure, the second storage device 7022 is further configured to start timing when the second storage device 7022 receives fault information sent by the first storage device 7021, and delete the file handle, or set the file handle to be invalid when a timing duration reaches a preset duration.

Figure 9:
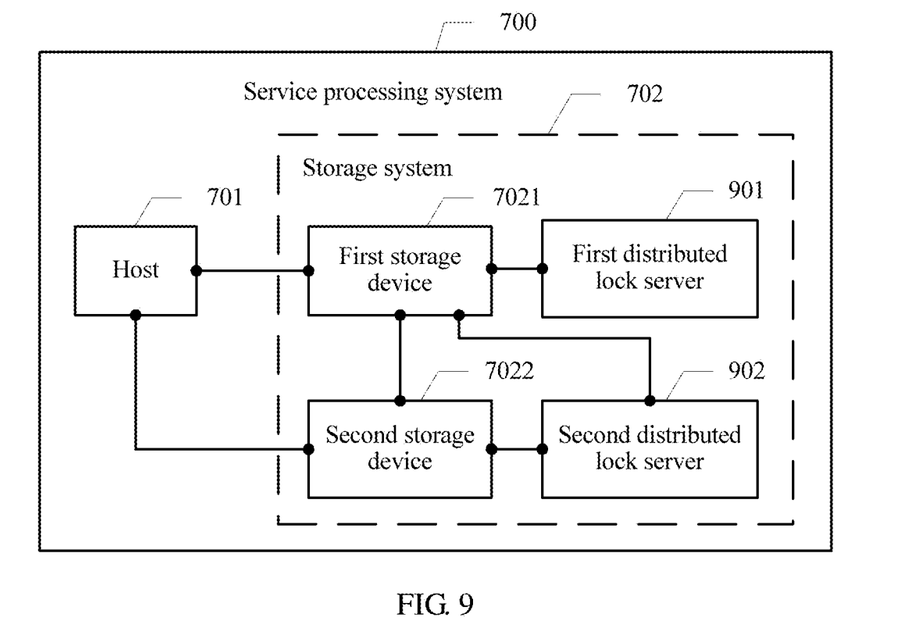
FIG. 9 is another schematic structural diagram of a service processing system according to an embodiment of the present disclosure.

Based on the embodiment shown in FIG. 7, in another optional embodiment of the present disclosure shown in FIG. 9, the first storage device 7021 is further configured to receive a lock instruction sent by the host 701, and send a file lock request to a first distributed lock server 901 according to the lock instruction before sending the file handle to the second storage device 7022. The first distributed lock server 901 sets, according to the file lock request, a file lock for the file corresponding to the file handle. The first storage device 7021 sends the file lock to the second storage device 7022, and the second storage device 7022 stores the file lock as a backup file lock, where the first storage device 7021 and the first distributed lock server 901 belong to a same storage array, and the first storage device 7021 and the second storage device 7022 belong to different storage arrays.

Based on the embodiment shown in FIG. 9, in another optional embodiment, the second storage device 7022 is further configured to send a silence request to a second distributed lock server 902 after storing the file handle as the backup handle, where file information carried in the silence request corresponds to the backup handle, and the second distributed lock server 902 is further configured to silently set, according to the file information, a file corresponding to the backup handle in the second storage device 7022, where the second distributed lock server 902 and the second storage device 7022 belong to a same storage array.

Further, in another optional embodiment, the second storage device 7022 is further configured to determine the backup file lock corresponding to the file handle, and send information about the backup file lock to the second distributed lock server 902 after the second storage device 7022 obtains the file handle corresponding to the handle identifier, and the second distributed lock server 902 is further configured to lock the file according to the information about the backup file lock.

Figure 10:
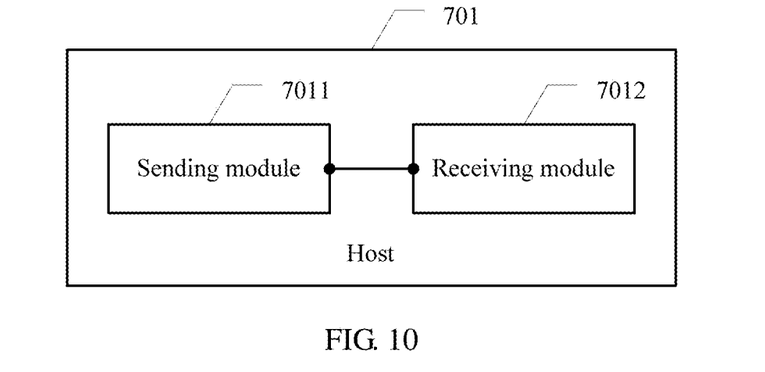
FIG. 10 is a schematic structural diagram of a host according to an embodiment of the present disclosure.

The following describes the host 701. Referring to FIG. 10, an embodiment of the host 701 provided in the present disclosure includes a sending module 7011 configured to send a first file open instruction to a first storage device, where the first file open instruction includes a persistent handle request, and the sending module 7011 is further configured to send a second file open instruction to the second storage device, when the first storage device is faulty and an IP address of the first storage device is activated on a second storage device, where the second file open instruction includes a handle identifier, and the handle identifier is used to instruct the second storage device to obtain a file handle of a file, and a receiving module 7012 configured to receive an operation result returned by the second storage device.

Based on the embodiment shown in FIG. 10, in an optional embodiment, the first file open instruction includes a persistent handle obtaining subcommand, and the persistent handle obtaining subcommand is used to instruct the first storage device to generate a persistent handle.

Based on the embodiment shown in FIG. 10, in another optional embodiment of the present disclosure, the second file open instruction includes a handle restoration subcommand, and the handle identifier is carried in the handle restoration subcommand.

Based on the embodiment shown in FIG. 10, in another optional embodiment of the present disclosure, the sending module 7011 is further configured to send a lock instruction to the first storage device, where the lock instruction is used to set a file lock for a file.

For ease of understanding, the following uses a specific application scenario to describe in detail each part of the service processing system in the embodiments of the present disclosure.

When the first storage device belongs to a storage array 1, and the second storage device belongs to a storage array 2, the storage array 2 is a backup array of the storage array 1, the second storage device is a backup device of the first storage device, a distributed lock server in the storage array 1 is the distributed lock server 901 shown in FIG. 9, a distributed lock server in the storage array 2 is the distributed lock server 902 shown in FIG. 9, and an IP address of the first storage device is x.x.x.2.

When a host accesses a file file_1 in the first storage device, the host 701 sends a first file open instruction to the first storage device, and a file system of the first storage device accesses the file in response to the first file open instruction. The first storage device generates a file handle 1 of the file_1 according to the first file open instruction, synchronizes the file handle 1 to the second storage device, and returns a handle identifier of the file handle 1 to the host 701. The first storage device may further generate, according to another file open instruction, a file handle 2 corresponding to a file_2, and synchronize the file handle 2 to the second storage device.

The host 701 may further initiate a lock instruction for the file_1 to the first storage device, the first storage device initiates a lock request to the distributed lock server 901 according to the lock instruction, and the distributed lock server 901 sets a range lock 1 and a range lock 2 for the file_1. After the locking succeeds, the first storage device synchronizes the range lock 1 and the range lock 2 to the second storage device.

When the storage array 1 is faulty, after the storage array 2 receives fault information, the storage device A' in the storage array 2 may traverse all backup handles, and select a backup handle (that is, the file handle 1) and backup file locks (that are, the range lock 1 and the range lock 2) that are corresponding to the storage device A, and the distributed lock server 902 sets a silence identifier for the file_1. When receiving the fault information, the second storage device may further set an aging duration for the file handle 1 of the file_1, and then may set an IP address of the second storage device to x.x.x.2, and the host establishes a connection to the second storage device.

When the file handle is a persistent handle, the host 701 sends a second file open instruction to x.x.x.2 after waiting for a period of time.

If there is no file lock for the file_1, the second storage device may obtain the file handle 1 according to the handle identifier that is of the file handle 1 and that is in the second file open instruction, and access the file_1 according to the file handle 1.

If the file_1 is provided with the range lock 1 and the range lock 2, the second storage device may obtain the file handle 1 and the range lock 1 and the range lock 2 according to the handle identifier that is of the file handle 1 and that is in the second file open instruction, and then the distributed lock server 902 restores the range locks of the file_1 according to the range lock 1 and the range lock 2, and returns a restoration result to the host. A method for processing another file (for example, the file_2) in the storage device A is similar to the method for processing the file_1, and a method for processing a file in another storage device (for example, a storage device B, C, or D) in the storage array 1 is similar to the method for processing the file in the storage device A, and details are not described herein again.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for processing server message block (SMB) service fault,
wherein the method is applied to a service processing system comprising a host and at least two storage devices, and wherein the method comprises:
receiving, by a first storage device, a first file open instruction from the host;
generating, by the first storage device, a file handle according to the first file open instruction;
receiving, by the first storage device, a lock instruction from the host;
sending, by the first storage device, a file lock request to a first distributed lock server according to the lock instruction;
setting, by the first distributed lock server according to the file lock request, a file lock for the file corresponding to the file handle;
sending, by the first storage device, the file lock to a second storage device;
storing, by the second storage device, the file lock as a back up file lock;
sending, by the first storage device, the file handle to the second storage device to instruct the second storage device to store the file handle as a backup handle;
sending, by the first storage device, a handle identifier of the file handle to the host;
receiving, by the second storage device, fault information indicating that the first storage device is faulty;
activating, by the second storage device, an Internet Protocol (IP) address of the first storage device on the second storage device in response to receiving the fault information;
establishing, by the second storage device, a communication connection with the host using the IP address of the first storage device;
receiving, by the second storage device, a second file open instruction from the host, wherein the second file open instruction comprises the handle identifier;
determining, by the second storage device, whether the file handle matches the handle identifier;
opening, by the second storage device, a file according to the file handle when the file handle matches the handle identifier; and
sending, by the second storage device, an operation result to the host.

2. The method of claim 1, wherein the first file open instruction comprises a persistent handle obtaining subcommand, wherein generating the file handle comprises generating, by the first storage device, the file handle according to the persistent handle obtaining subcommand, and wherein the method further comprises:
determining, by the first storage device, whether the file handle comprises a persistent handle; and
sending, by the first storage device, the file handle to the second storage device when the file handle comprises the persistent handle.

3. The method of claim 1, wherein the second file open instruction comprises a handle restoration subcommand, and wherein the handle identifier is comprised in the handle restoration subcommand.

4. The method of claim 1, wherein the first storage device, the second storage device, and the first distributed lock server belong to a same storage array.

5. The method of claim 4, wherein after storing the file handle as the backup handle, the method further comprises:
sending, by the second storage device, a silence request to the first distributed lock server, wherein file information comprised in the silence request corresponds to the backup handle; and
silently setting, by the first distributed lock server, a file corresponding to the backup handle in the second storage device according to the file information.

6. The method of claim 5, wherein after determining the file handle matching the handle identifier, the method further comprises:
determining, by the second storage device, the backup file lock corresponding to the file handle;
sending, by the second storage device, information about the backup file lock to the first distributed lock server; and
locking, by the first distributed lock server, the file according to the information about the backup file lock.

7. The method of claim 1, wherein
the first storage device and the first distributed lock server belong to a same storage array, and wherein the first storage device and the second storage device belong to different storage arrays.

8. The method of claim 7, wherein after storing the file handle as the backup handle, the method further comprises:
sending, by the second storage device, a silence request to a second distributed lock server, wherein file information comprised in the silence request corresponds to the backup handle; and
silently setting, by the second distributed lock server according to the file information, a file corresponding to the backup handle in the second storage device, wherein the second distributed lock server and the second storage device belong to a same storage array.

9. The method of claim 8, wherein after determining whether the file handle matches the handle identifier, the method further comprises:
determining, by the second storage device, the backup file lock corresponding to the file handle;
sending, by the second storage device, information about the backup file lock to the second distributed lock server when the file handle matches the handle identifier; and
locking, by the second distributed lock server, the file according to the information about the backup file lock.

10. The method of claim 1, further comprising:
starting, by the second storage device, a timer in response to receiving the fault information; and updating, by the second storage device, the backup handle when a timing duration reaches a preset duration, wherein updating the backup handle comprises either deleting the backup handle or setting the backup handle is invalid.

11. A storage system, comprising:
a first storage device configured to:
  receive a first file open instruction from a host;
  generate a file handle according to the first file open instruction;
  receive a lock instruction from the host;
  send a file lock request to a first distributed lock server according to the lock instruction;
  send the file handle to a second storage device to instruct the second storage device to store the file handle as a backup handle; and
send a handle identifier of the file handle to the host;
the second storage device coupled to the first storage device and configured to:
  receive fault information indicating that the first storage device is faulty;
  activate an Internet Protocol (IP) address of the first storage device on the second storage device in response to receiving the fault information;
  establish a communication connection with the host using the IP address of the first storage device;
  receive a second file open instruction from the host, wherein the second file open instruction comprises a handle identifier;
  determine whether the file handle matches the handle identifier; and
  open a file according to the file handle and send an operation result to the host when the file handle matches the handle identifier; and
the first distributed lock server configured to:
  set, according to the file lock request, a file lock for the file corresponding to the file handle;
  wherein the first storage device is further configured to send the file lock to the second storage device, and
  wherein the second storage device is further configured to store the file lock as a backup file lock.

12. The storage system of claim 11, wherein the first file open instruction comprises a persistent handle obtaining subcommand, and wherein the first storage device is further configured to:
  generate the file handle according to the persistent handle obtaining subcommand;
  determine whether the file handle comprises a persistent handle; and
  send the file handle to the second storage device when the file handle comprises the persistent handle.

13. The storage system of claim 11, wherein the second file open instruction comprises a handle restoration subcommand, and wherein the handle identifier is comprised in the handle restoration subcommand.

14. The storage system of claim 11,
  wherein the first storage device, the second storage device, and the first distributed lock server belong to a same storage array.

15. The storage system of claim 14, wherein the second storage device is further configured to send a silence request to the first distributed lock server after storing the file handle as the backup handle, wherein file information comprised in the silence request corresponds to the backup handle, and wherein the first distributed lock server is further configured to silently set, according to the file information, a file corresponding to the backup handle in the second storage device.

16. The storage system of claim 14, wherein the second storage device is further configured to:
  determine the backup file lock corresponding to the file handle; and
  send information about the backup file lock to the first distributed lock server, and
  wherein the first distributed lock server is further configured to lock the file according to the information about the backup file lock.

17. The storage system of claim 11, wherein the first storage device and the first distributed lock server belong to a same storage array, and wherein the first storage device and the second storage device belong to different storage arrays.

18. The storage system of claim 17, wherein the storage system further comprises a second distributed lock server, wherein the second distributed lock server and the second storage device belong to a same storage array, wherein the second storage device is further configured to send a silence request to the second distributed lock server after the second storage device stores the file handle as the backup handle, wherein file information comprised in the silence request corresponds to the backup handle, and wherein the second distributed lock server is configured to silently set, according to the file information, a file corresponding to the backup handle in the second storage device.

19. The storage system of claim 11, wherein the second storage device is further configured to:
  start a timer in response to receiving the fault information; and
  either delete the backup handle or set the backup handle as invalid when a timing duration reaches a preset duration.

20. A method for processing server message block (SMB) service fault, wherein the method is applied to a service processing system comprising a host and at least two storage devices, and wherein the method comprises:
  receiving, by a first storage device, a first file open instruction from the host;
  generating, by the first storage device, a file handle according to the first file open instruction;
  sending, by the first storage device, the file handle to the second storage device to instruct the second storage device to store the file handle as a backup handle;
  sending, by the first storage device, a handle identifier of the file handle to the host;
  receiving, by the second storage device, fault information indicating that the first storage device is faulty;
  starting, by the second storage device, a timer in response to receiving the fault information;
  updating, by the second storage device, the backup handle when a timing duration reaches a preset duration, wherein updating the backup handle comprises either deleting the backup handle or setting the backup handle is invalid;
  activating, by the second storage device, an Internet Protocol (IP) address of the first storage device on the second storage device in response to receiving the fault information;
  establishing, by the second storage device, a communication connection with the host using the IP address of the first storage device;
  receiving, by the second storage device, a second file open instruction from the host, wherein the second file open instruction comprises the handle identifier;

determining, by the second storage device, whether the file handle matches the handle identifier;

opening, by the second storage device, a file according to the file handle when the file handle matches the handle identifier; and sending, by the second storage device, an operation result to the host.

* * * * *

UNITED STATES PATENT AND TRADEMARK OFFICE
CERTIFICATE OF CORRECTION

PATENT NO. : 10,789,138 B2
APPLICATION NO. : 15/948499
DATED : September 29, 2020
INVENTOR(S) : Zhengjiang Wang et al.

Page 1 of 1

It is certified that error appears in the above-identified patent and that said Letters Patent is hereby corrected as shown below:

In the Claims

Claim 10, Column 17, Line 5: "is invalid" should read "as invalid"

Claim 20, Column 18, Line 57: "is invalid" should read "as invalid"

Signed and Sealed this
Tenth Day of November, 2020

Andrei Iancu
*Director of the United States Patent and Trademark Office*